(12) United States Patent
Sagawa et al.

(10) Patent No.: US 9,623,726 B2
(45) Date of Patent: Apr. 18, 2017

(54) WINDOWPANE FOR VEHICLES AND METHOD FOR PRODUCING SAME

(71) Applicant: Asahi Glass Company, Limited, Chiyoda-ku, Tokyo (JP)

(72) Inventors: Yasuhiro Sagawa, Tokyo (JP); Yuukou Minamiya, Tokyo (JP)

(73) Assignee: ASAHI GLASS COMPANY, LIMITED, Tokyo (JP)

( * ) Notice: Subject to any disclaimer, the term of this patent is extended or adjusted under 35 U.S.C. 154(b) by 804 days.

(21) Appl. No.: 13/941,053

(22) Filed: Jul. 12, 2013

(65) Prior Publication Data

US 2014/0008347 A1   Jan. 9, 2014

Related U.S. Application Data

(63) Continuation of application No. PCT/JP2012/050584, filed on Jan. 13, 2012.

(30) Foreign Application Priority Data

Jan. 14, 2011   (JP) .................................. 2011-005866

(51) Int. Cl.
*H05B 3/86* (2006.01)
*B60J 1/02* (2006.01)
(Continued)

(52) U.S. Cl.
CPC .............. *B60J 1/002* (2013.01); *B23K 35/262* (2013.01); *B60J 1/02* (2013.01); *C03C 8/18* (2013.01);
(Continued)

(58) Field of Classification Search
CPC ......... B23K 35/3262; B60J 1/002; B60J 1/02; C03C 17/007; C03C 8/18;
(Continued)

(56) References Cited

U.S. PATENT DOCUMENTS 3,391,447 A * 7/1968 Ard ........................ B23K 1/19
126/91 A
5,782,945 A * 7/1998 Gavin ...................... C03C 8/18
427/125
(Continued)

FOREIGN PATENT DOCUMENTS

EP   2 257 120 A2   12/2010
JP   2000-067647 A   3/2000
(Continued)

OTHER PUBLICATIONS

Extended European Search Report dated Mar. 9, 2015 issued in Application No. 12734551.0.
(Continued)

*Primary Examiner* — Geoffrey S Evans
(74) *Attorney, Agent, or Firm* — Foley & Lardner LLP

(57) ABSTRACT

The present invention is concerned with a windowpane for vehicles including a glass sheet, a conductor layer which is formed on the surface of the glass sheet by sintering a silver paste containing a silver powder and a glass frit and which has at least a strip part and a terminal connection part connected to the strip part, and a connection terminal soldered onto the terminal connection part with a lead-free solder alloy, in which the conductor layer has a specific resistance of from 2.5 to 6.5 µΩcm, the strip part has a line width of not more than 0.35 mm, the lead-free solder alloy consists essentially of tin and silver and has a content of tin of 95% by mass or more, and cracking is not caused on the glass sheet even after elapsing 500 cycles in a prescribed thermal shock test; and a method for producing same.

14 Claims, 2 Drawing Sheets

(51) Int. Cl.
  *B60J 1/00* (2006.01)
  *C03C 8/18* (2006.01)
  *C03C 17/00* (2006.01)
  *B23K 35/26* (2006.01)

(52) U.S. Cl.
  CPC ............. *C03C 17/007* (2013.01); *H05B 3/86* (2013.01); *C03C 2217/452* (2013.01); *C03C 2217/479* (2013.01); *H05B 2203/011* (2013.01); *H05B 2203/013* (2013.01); *H05B 2203/016* (2013.01); *H05B 2203/017* (2013.01); *Y10T 29/49117* (2015.01)

(58) Field of Classification Search
  CPC ........ C03C 2217/452; C03C 2217/479; H05B 3/84; H05B 3/86; H05B 2203/011; H05B 2203/016; H05B 2203/017
  USPC ........................................................ 219/203
  See application file for complete search history.

(56) References Cited

U.S. PATENT DOCUMENTS

| | | | | |
|---|---|---|---|---|
| 5,795,501 | A * | 8/1998 | Kano | .................. C03C 8/14 106/1.19 |
| 6,134,918 | A * | 10/2000 | Eto | ..................... G11B 5/8404 65/30.14 |
| 6,253,988 | B1 | 7/2001 | Pereira | |
| 7,053,313 | B2 | 5/2006 | Hahn et al. | |
| 7,267,713 | B2 * | 9/2007 | Adachi | ..................... C03C 8/04 106/1.14 |
| 7,379,028 | B2 * | 5/2008 | Hisaeda | ............... H01Q 1/1271 219/203 |
| 2002/0142517 | A1 | 10/2002 | Maeda et al. | |
| 2004/0152238 | A1 | 8/2004 | Maeda et al. | |
| 2004/0214016 | A1 | 10/2004 | Adachi | |
| 2005/0112291 | A1 * | 5/2005 | Okajima | ............. B23K 1/0008 427/447 |
| 2006/0102610 | A1 * | 5/2006 | Hoepfner | ................. H05B 3/84 219/203 |
| 2007/0029299 | A1 * | 2/2007 | Prone | ................ B32B 17/10036 219/203 |
| 2007/0036670 | A1 | 2/2007 | Pereira | |
| 2007/0037004 | A1 | 2/2007 | Pereira | |
| 2007/0105412 | A1 | 5/2007 | Hoepfner et al. | |
| 2007/0187652 | A1 * | 8/2007 | Konno | ..................... H01B 1/02 252/500 |
| 2007/0231594 | A1 | 10/2007 | Pereira | |
| 2007/0292708 | A1 | 12/2007 | Pereira | |
| 2008/0175748 | A1 | 7/2008 | Pereira | |
| 2009/0095512 | A1 | 4/2009 | Okahata et al. | |
| 2009/0155500 | A1 * | 6/2009 | Cooper | ................. E06B 3/6612 428/34 |
| 2011/0042370 | A1 * | 2/2011 | Choi | ................... C03C 17/3644 219/553 |
| 2011/0201147 | A1 * | 8/2011 | Akimoto | ................... C03C 8/04 438/98 |
| 2013/0206230 | A1 * | 8/2013 | Sridharan | ............... H01L 23/10 136/259 |

FOREIGN PATENT DOCUMENTS

| | | |
|---|---|---|
| JP | 2001-206056 | 7/2001 |
| JP | 2009-286260 | 9/2003 |
| JP | 2004-327356 A | 11/2004 |
| JP | 2005-509269 A | 4/2005 |
| JP | 2008-105200 A1 | 9/2008 |
| JP | 2009-504411 A | 2/2009 |
| JP | 2010-182907 A | 8/2010 |
| WO | WO 03/076239 A1 | 9/2003 |
| WO | WO-2008/105200 A1 | 9/2008 |
| WO | WO-2009/116787 A2 * | 9/2009 |

OTHER PUBLICATIONS

International Search Report PCT/JP2012/050584 dated Feb. 21, 2012.

* cited by examiner

WINDOWPANE FOR VEHICLES AND METHOD FOR PRODUCING SAME

TECHNICAL FIELD

The present invention relates to a windowpane for vehicles having a conductor layer such as a defogger, a deicer, an antenna, etc. on the surface thereof and a method for producing same.

BACKGROUND ART

On the surface of a windowpane for vehicles such as an automobile backlite, etc., there may be provided a conductor layer having a pattern such as a defogger for defogging, a deicer for deicing, an antenna for radio reception, etc. For example, a defogger or deicer is constituted of a heater line (strip part) and a bus bar connected to the heater line and having an electricity feeding point (terminal connection part) for feeding electricity into the heater line, and an antenna is constituted of an antenna conductor (strip part) and a terminal connection part for connecting an external antenna circuit to the antenna conductor.

A conductor layer is generally formed by printing a silver paste containing a silver powder and a glass frit in a prescribed pattern on the surface of a glass sheet, followed by sintering. Then, a metal-made connection terminal for connection to an external power source or antenna circuit is soldered onto the terminal connection part of the conductor layer. For soldering the connection terminal onto the terminal connection part, a tin-lead-silver based solder alloy has hitherto been used.

On the other hand, in the case of performing soldering on a glass sheet, there was encountered such a problem that cracking is easily caused on the glass sheet due to a thermal stress during heating and a residual stress after cooling generated following a temperature change of soldering. This is chiefly caused due to the fact that a difference in thermal expansion coefficient between the solder alloy and a soda lime glass which is widely used for automobile glasses is relatively large. Therefore, among tin-lead-silver based alloys, an alloy in which the content of lead having a low elastic modulus is made larger than that of tin having a high elastic modulus is used for soldering of a windowpane for vehicles. This is because the alloy having a larger content of lead is able to relieve the stresses generated in the glass sheet accompanied with a temperature change.

In recent years, the needs for lead-free products have been increasing in view of an increase of an interest in the environmental issue. Consequently, it is required to use a lead-free solder alloy, for example, a tin based lead-free solder alloy composed mainly of tin, for soldering the connection terminal onto the terminal connection part. However, there is a concern that the tin based lead-free solder alloy impairs the appearance of the conductor layer, and its joining strength is also insufficient. In addition, there is also involved such a problem that cracking is easily caused on the glass sheet.

As for these problems, Patent Document 1 proposes the use of a tin-silver based lead-free solder alloy composed mainly of tin and containing 1.5% by mass or more of silver.

PRIOR ART DOCUMENT

Patent Document

Patent Document 1: WO-A-2003/076239

SUMMARY OF THE INVENTION

Problems that the Invention is to Solve

However, in the case of using the tin-silver based lead-free solder alloy described in Patent Document 1, although a joining strength that is high to some extent is obtained immediately after soldering, there is a concern that when a thermal shock test of alternate repetition of cooling and heating is performed, the joining strength is lowered, or cracking is caused on the glass sheet. Since the tin-silver based lead-free solder alloy does not use lead having a low elastic modulus, it has a larger elastic modulus than the tin-lead-silver based solder alloy, so that the stresses generated accompanied with a temperature change are liable to become large. Accordingly, a residual stress is generated on the glass sheet accompanied with a temperature change at the time of the thermal shock test, and as a result, in the glass sheet of windowpane for vehicles, cracking is easily caused on the glass sheet in a soldered portion between the terminal connection part and the connection terminal.

Furthermore, in the case of using the tin-silver based lead-free solder alloy described in Patent Document 1, there is a concern that the appearance of the terminal connection part in the soldered portion is impaired. Although a lowering of the appearance quality is suppressed as compared with the case of not containing silver, it may not be said that its effect is sufficient. As a result, there is a concern that the completeness of an appearance design as a whole of the windowpane for vehicles is impaired. Therefore, it was difficult to obtain a windowpane for vehicles satisfying all of desired conductive performance, joining strength and appearance design through a combination of a conventional lead-free solder alloy with a conductor layer-provided glass sheet.

In soldering a tin-silver based lead-free solder alloy onto a glass sheet, the present invention provides a windowpane for vehicles, in which even when exposed to high temperature or low temperature, a good joining strength is kept, cracking of the glass sheet is prevented from occurring, and the completeness of an appearance design is high, and a method for producing same.

Means for Solving the Problems

The first embodiment according to the present invention is a windowpane for vehicles comprising a glass sheet, a conductor layer which is formed on a surface of the glass sheet by sintering a silver paste containing a silver powder and a glass frit, said conductor layer comprising at least a strip part and a terminal connection part connected to the strip part, and a connection terminal soldered onto the terminal connection part with a lead-free solder alloy, wherein the conductor layer has a specific resistance of from 2.5 to 6.5 $\mu\Omega$cm, the strip part has a line width of not more than 0.35 mm, the lead-free solder alloy consists essentially of tin and silver and has a content of tin of 95% by mass or more, and a cracking is not caused on the glass sheet even after elapsing 500 cycles in a thermal shock test where a cycle of keeping the windowpane for vehicles at −30° C. for 30 minutes, followed by increasing a temperature of the windowpane to 80° C. in 3 minutes, keeping the windowpane at 80° C. for 30 minutes, and decreasing the temperature of the windowpane to −30° C. in 3 minutes is repeated as one cycle.

The second embodiment according to the present invention is a windowpane for vehicles comprising a glass sheet, a conductor layer which is formed on a surface of the glass sheet by sintering a silver paste containing a silver powder and a glass frit, said conductor layer comprising at least a strip part and a terminal connection part connected to the strip part, and a connection terminal soldered onto the terminal connection part with a lead-free solder alloy, wherein the conductor layer has a specific resistance of from 2.5 to 6.5 μΩcm, the strip part has a line width of not more than 0.35 mm, the lead-free solder alloy consists essentially of tin and silver and has a content of tin of 95% by mass or more, and the windowpane for vehicles is obtained by preheating the glass sheet at a temperature of 50° C. or higher and not higher than a temperature at which the lead-free solder alloy begins to melt and then performing said soldering.

In the second embodiment according to the present invention, the windowpane for vehicles is preferably obtained by preheating the glass sheet at a temperature of 75° C. or higher and not higher than a temperature at which the lead-free solder alloy begins to melt and then performing said soldering.

In the first or second embodiment according to the present invention, it is preferable that the content of the silver powder contained in the silver paste is from 65 to 85% by mass, and that the average particle diameter of the silver powder is from 0.1 to 10 μm.

In the aforementioned embodiment, the conductor layer preferably has a thickness of from 5 to 20 μm.

In the aforementioned embodiment, the line width of the strip part is preferably from 0.15 to 0.35 mm.

In the aforementioned embodiment, the conductor layer is preferably a defogger, a deicer, or an antenna.

The third embodiment according to the present invention is a windowpane for vehicles comprising a glass sheet, a conductor layer which is formed on a surface of the glass sheet by sintering a silver paste containing a silver powder and a glass frit, said conductor layer comprising at least a strip part and a terminal connection part connected to the strip part, and a connection terminal soldered onto the terminal connection part with a lead-free solder alloy, wherein the conductor layer has a specific resistance of from 2.5 to 6.5 μΩcm, the strip part has a line width of not more than 0.35 mm, the lead-free solder alloy consists essentially of tin, silver and further at least one metal selected from the group consisting of copper, indium, bismuth, and zinc and has a content of tin of 95% by mass or more, and a cracking is not caused on the glass sheet even after elapsing 500 cycles in a thermal shock test where a cycle of keeping the windowpane for vehicles at −30° C. for 30 minutes, followed by increasing a temperature of the windowpane to 80° C. in 3 minutes, keeping the windowpane at 80° C. for 30 minutes, and decreasing the temperature of the windowpane to −30° C. in 3 minutes is repeated as one cycle.

In the third embodiment according to the present invention, it is preferable that the content of the silver powder contained in the silver paste is from 65 to 85% by mass, and that the average particle diameter of the silver powder is from 0.1 to 10 μm.

In the third embodiment according to the present invention, the conductor layer preferably has a thickness of from 5 to 20 μm.

In the third embodiment according to the present invention, the line width of the strip part is preferably from 0.15 to 0.35 mm.

In the third embodiment according to the present invention, the conductor layer is preferably a defogger, a deicer, or an antenna.

The fourth embodiment according to the present invention is a method for producing a windowpane for vehicles, comprising steps of printing a silver paste containing a silver powder and a glass frit on a surface of a glass sheet, sintering the silver paste to form a conductor layer, which comprises at least a strip having a line width of not more than 0.35 mm and a terminal connection part connected to the strip part and which has a specific resistance of from 2.5 to 6.5 μΩcm, attaching a lead-free solder alloy, which consists essentially of tin and silver and which has a content of tin of 95% by mass or more, to at least a connection terminal, preheating the glass sheet having the conductor layer formed on the surface thereof at a temperature of 50° C. or higher and not higher than a temperature at which the lead-free solder alloy begins to melt, and connecting the connection terminal to the terminal connection part with the lead-free solder alloy.

In the fourth embodiment according to the present invention, it is preferable that the glass sheet having the conductor layer formed on the surface thereof is preheated at a temperature of 75° C. or higher and not higher than a temperature at which the lead-free solder alloy begins to melt.

In the fourth embodiment according to the present invention, it is preferable that the content of the silver powder contained in the silver paste is from 65 to 85% by mass, and that the average particle diameter of the silver powder is from 0.1 to 10 μm.

In the fourth embodiment according to the present invention, the conductor layer preferably has a thickness of from 5 to 20 μm.

In the fourth embodiment according to the present invention, the line width of the strip part is preferably from 0.15 to 0.35 mm.

Advantage of the Invention

According to the foregoing embodiments, in soldering a tin-silver based lead-free solder alloy onto a glass sheet, it is possible to realize a windowpane for vehicles, in which even when exposed to high temperature or low temperature, a good joining strength is kept, cracking of the glass sheet is prevented, and the completeness of an appearance design is high, and a method for producing same.

MODE FOR CARRYING OUT THE INVENTION

Windowpane for Vehicles of First Embodiment

The windowpane for vehicles of the present embodiment is a windowpane for vehicles comprising a glass sheet, a conductor layer which is formed on a surface of the glass sheet by sintering a silver paste containing a silver powder and a glass frit, said conductor layer comprising at least a strip part and a terminal connection part connected to the strip part, and a connection terminal soldered onto the terminal connection part with a lead-free solder alloy, wherein the conductor layer has a specific resistance of from 2.5 to 6.5 μΩcm, the strip part has a line width of not more than 0.35 mm, the lead-free solder alloy consists essentially of tin and silver and has a content of tin of 95% by mass or more, and a cracking is not caused on the glass sheet even after elapsing 500 cycles in a thermal shock test where a cycle of keeping the windowpane for vehicles at −30° C. for 30 minutes, followed by increasing a temperature of the windowpane to 80° C. in 3 minutes, keeping the windowpane at 80° C. for 30 minutes, and decreasing the temperature of the windowpane to −30° C. in 3 minutes is repeated as one cycle.

Figure 1:
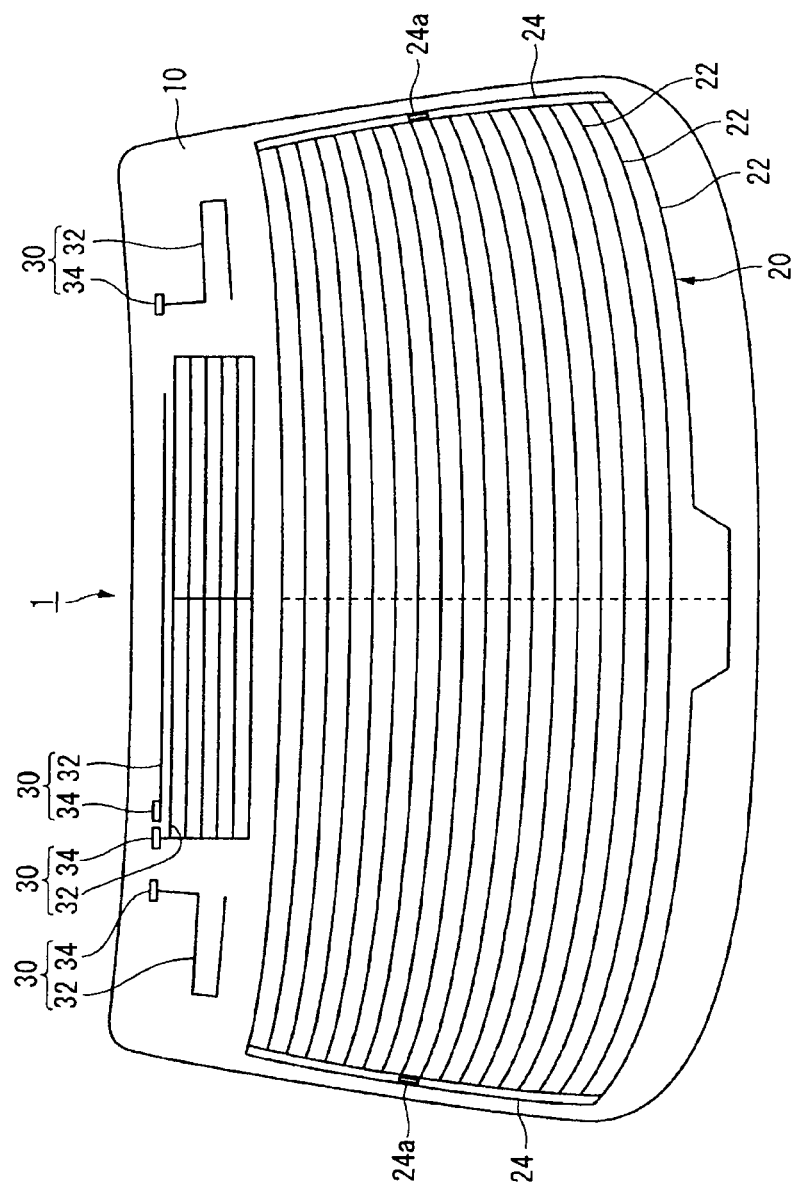
FIG. 1 is a front view showing an example of a windowpane for vehicles of the present invention.

As an example of the windowpane for vehicles of the present embodiment, an example of an automobile backlite is shown in FIG. 1. FIG. 1 is a front view of a backlite 1 of this example seen from the vehicle exterior side at the time of installation in the vehicle. The backlite 1 is provided with a glass sheet 10, and on the surface of the glass sheet 10 of the vehicle interior side, a picture frame-shaped black ceramic part (not shown) is formed in the periphery thereof, and furthermore, a conductor layer having a prescribed pattern is formed. As the conductor layer, a member (defogger 20) having a pattern of a defogger for defogging and a member (antenna 30) having a pattern of an antenna are formed.

The defogger 20 has plural heater lines 22 extending in the horizontal direction of the backlite 1 and two bus bars 24 extending in the vertical direction of the backlite 1. The bus bars 24 are formed on the surfaces of black ceramic parts (not shown) at the both ends of the horizontal direction of the backlite 1. The heater lines 22 are formed between the two bus bars 24, and the both ends of each of the heater lines 22 are connected to the two bus bars 24, respectively.

Metal-made connection terminals (not shown) are soldered onto the bus bars 24 (on the vehicle interior side) with a lead-free solder alloy. The connection terminals are connected to an external power source (not shown), and electricity is fed into the heater lines 22 while allowing positions (terminal connection parts) 24a of the bus bars 24, at which the connection terminals are connected, to serve as an electricity feeding point.

The antenna 30 has an antenna conductor (strip part) 32 and a terminal connection part 34 connected to the antenna line 32. In the backlite 1 of the embodiment shown in FIG. 1, the antenna 30 is disposed in a blank space region where the upper defogger 20 is not formed. In the respective antennas 30, plural kinds of the antenna conductors 32 having varied pattern and length are formed depending upon the wavelength of a radio wave to be received, and the terminal connection part 34 is formed at the end of each of the antenna conductors 32.

Metal-made connection terminals (not shown) are soldered onto the terminal connection parts 34 (on the vehicle interior side) with a lead-free solder alloy, and the antennas 30 are connected to an external antenna circuit via the connection terminals.

Figure 2:
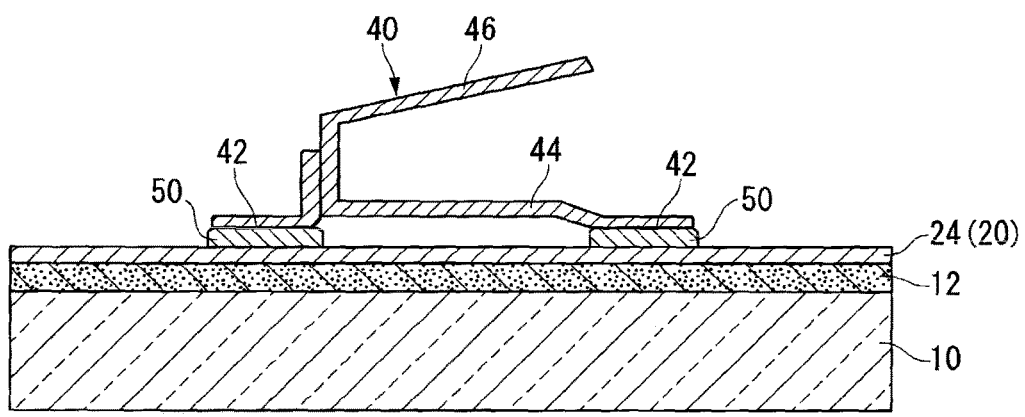
FIG. 2 is an enlarged cross-sectional view showing an example of a windowpane for vehicles in the surroundings of a soldered portion of a connection terminal.

In an embodiment described in FIG. 2, an enlarged cross-sectional view of the backlite 1 in the surroundings of a soldered portion between the bus bar 24 (terminal connection part 24a) of the defogger 20 and the connection terminal is shown. In FIG. 2, the upper side thereof is the vehicle interior side at the time of installation in the vehicle.

A black ceramic part 12 is formed on the surface of the glass sheet 10, and the bus bar 24 is formed on the surface of the black ceramic part 12. A connection terminal 40 is connected to the surface of the bus bar 24.

The connection terminal 40 has a leg part 44 having two joint surfaces 42 at the both ends thereof and a wiring connection part 46 bent upward from the leg part 44. A connector (not shown) of a tip of an external line (not shown) is connected to the wiring connection part 46. The two joint surfaces 42 of the connection terminal 40 are each soldered onto the surface of the bus bar 24 with a lead-free solder alloy 50.

A structure of the soldered portion between the terminal connection part 34 of the antenna 30 and the connection terminal (not shown) is the same as the structure of the soldered portion between the bust bar 24 of the defogger 20 and the connection terminal 40 shown in FIG. 2.

(Glass Sheet 10)

As the glass sheet 10, known glass sheets which are set up for windows of vehicles may be used.

In the case of a backlite for automobiles, in general, the glass sheet 10 has a substantially trapezoidal shape curved by bending processing.

Examples of the glass sheet 10 include those having a known glass composition, such as a soda lime glass, etc., and a heat absorbing glass having a high iron content (blue glass or green glass) is preferable.

For the purpose of increasing the safety, a strengthened glass sheet may be used as the glass sheet 10. As the strengthened glass sheet, strengthened glass sheets obtained by an air cooling strengthening method or a chemical strengthening method can be used. In addition, the glass sheet 10 may also be a laminated glass obtained by sticking two glass sheets with a resin film.

In addition, the glass sheet 10 may also be a glass sheet in which a picture frame-shaped black ceramic part is formed in the periphery thereof. The black ceramic part is formed by printing a black ceramic paste on the surface of the periphery of the glass sheet 10, followed by sintering the same.

(Conductor Layer)

The conductor layer (the defogger 20 or the antenna 30) is formed by printing a silver paste in a prescribed pattern on the surface of the glass sheet 10, followed by sintering the same.

From the standpoints of productivity and cost, the strip part (the heater line 22 or the antenna conductor 32) of the conductor layer and other portions (the bus bar 24 or the terminal connection part 34) are preferably those composed of fired materials of the same silver paste, which are simultaneously formed by one-time printing and subsequent sintering.

Details of the silver paste are described later. In addition, details of a method for forming a conductor layer using a silver paste are described by referring to a production method of a windowpane for vehicles of the fourth embodiment as described later.

The specific resistance of the conductor layer is from 2.5 to 6.5 μΩcm, more preferably from 2.8 to 6.1 μΩcm, and still more preferably from 2.8 to 3.8 μΩcm. When the specific resistance of the conductor layer is not more than 6.5 μΩcm, cracking is hardly caused on the glass sheet 10 in the soldered portion of the connection terminal for the following reason 1. When the specific resistance of the conductor layer is 2.5 μΩcm or more, it is not necessary to make a cross-sectional area (line width and thickness) of the strip part small more than necessary in order to obtain an electric resistance (Ω) that is considered to be necessary for the strip part (the heater line 22 or the antenna conductor 32).

Reason 1: The specific resistance of the conductor layer can be controlled to a low level by making the silver powder in the conductor layer dense to make voids small. When a proportion of the voids in the conductor layer is low, on the occasion of soldering of the connection terminal, the lead-free solder alloy that is different in thermal expansion rate from the glass sheet 10 is melted and hardly penetrates into the terminal connection parts 24a and 34, whereby a stress to be caused due to the difference in thermal expansion rate, which is conducted into the glass sheet 10 via the terminal connection parts 24a and 34, is suppressed. As a result, a residual stress generated on the glass sheet 10 is also suppressed, so that cracking of the glass sheet 10 is hardly caused.

The specific resistance of the conductor layer can be adjusted by properly selecting a content of the silver powder in the silver paste, an average particle diameter of the silver powder, blending of plural kinds of silver pastes having a different content or average particle diameter of the silver powder from each other, addition of a resistance adjusting agent to the silver paste, a sintering condition of the silver paste, or the like.

The specific resistance of the conductor layer is determined according to the following equation (1) by measuring an electric resistance (Ω) of a length of 200 mm in the strip part.

$$\text{Specific resistance } (\mu\Omega\text{cm}) = [\{\text{electric resistance } (\Omega)\} \times \{\text{cross-sectional area of strip part } (m^2)\} \times 10^8]/\{\text{length of strip part (namely, 0.2 m)}\} \quad (1)$$

The line width of the strip part (the heater line 22 and the antenna conductor 32) of the conductor layer is not more than 0.35 mm, preferably from 0.15 to 0.35 mm, and more preferably from 0.25 to 0.35 mm. When the line width of the strip part is not more than 0.35 mm, cracking is hardly caused on the glass sheet 10 in the soldered portion between the terminal connection parts 24a and 34 and the connection terminal for the following reason 2. In addition, in the case where the line width of the strip part is 0.15 mm or more, particularly 0.25 mm or more, the strip part is easily formed by means of printing, and the electric resistance (Ω) of the strip part does not become large more than necessary, and hence, such is preferable.

Reason 2: The electric resistance (Ω) of the strip part is inverse proportion to the cross-sectional area of the strip part. It is desirable to make the thickness of the conductor layer (including the strip part) thick to an extent of at least the desired thickness or more for a reason 3 as described later, and therefore, in many cases, the line width of the strip part must be made narrow in order to obtain an electric resistance (Ω) that is considered to be necessary for the strip part. In addition, by making the line width of the strip part narrow, the cross-sectional area of the strip part becomes small, and hence, the silver powder becomes easy to contact densely, so that it is possible to sufficiently decrease the specific resistance (μΩcm) of the whole of the conductor layer (including the bus bar 24 and the terminal connection part 34). As a result, a residual stress generated on the glass sheet 10 is also suppressed for the foregoing reason 1, so that cracking is hardly caused on the glass sheet 10.

The thickness of the conductor layer is preferably from 5 to 20 μm, more preferably from 5 to 15 μm, still more preferably from 5 to 10 μm, yet still more preferably from 6 to 10 μm, and especially preferably from 6 to 8 μm. When the thickness of the conductor layer is 5 μm or more, cracking is hardly caused on the glass sheet 10 in the soldered portion between the terminal connection part and the connection terminal for the following reason 3. When the thickness of the conductor layer is not more than 20 μm, the conductor layer is easily formed by means of printing.

Reason 3: When the conductor layer is thicker, namely the terminal connection parts 24a and 34 are thicker, on the occasion of soldering of the connection terminal, the melted lead-free solder alloy hardly goes through the terminal connection parts 24a and 34 to reach the black ceramic part, furthermore the glass sheet 10, whereby a stress to be caused due to the difference in thermal expansion rate, which is conducted into the glass sheet 10 via the terminal connection parts 24a and 34, is suppressed. As a result, a residual stress generated on the glass sheet 10 is also suppressed, so that cracking is hardly caused on the glass sheet 10.

(Silver Paste)

The silver paste is a paste containing a silver powder and a glass frit and further optionally containing a vehicle and an additive.

The silver powder is a particle of silver or that of a silver alloy.

The content of the silver powder is preferably from 65 to 85% by mass, more preferably from 75 to 85% by mass, and still more preferably from 80 to 85% by mass in the silver paste (100% by mass). So long as the content of the silver powder falls within the foregoing range, it is easy to adjust the specific resistance of the conductor layer to the foregoing range.

The average particle diameter of the silver powder is preferably from 0.1 to 10 μm, and more preferably from 0.1 to 7 μm. So long as the average particle diameter of the silver powder falls within the foregoing range, it is easy to adjust the specific resistance of the conductor layer to the foregoing range. The average particle diameter of the silver powder refers to an average particle diameter (D50) measured by a laser scattering-type particle size analyzer.

Examples of the glass frit include a $Bi_2O_3$—$B_2O_3$—$SiO_2$ based glass frit, a $B_2O_3$—$SiO_2$ based glass frit, and the like.

The content of the glass frit is preferably from 2 to 10% by mass, and more preferably from 3 to 8% by mass in the silver paste (100% by mass). When the content of the glass frit is 2% by mass or more, the conductor layer is easily sintered, whereas when it is not more than 10% by mass, it is easy to adjust the specific resistance of the conductor layer to the foregoing range.

Examples of the vehicle include resin solutions obtained by dissolving a binder resin such as an ethyl cellulose resin, an acrylic resin, an alkyd resin, etc. in a solvent such as α-terpineol, butyl carbitol acetate, ethyl carbitol acetate, etc., and the like.

The content of the vehicle is preferably from 10 to 30% by mass, and more preferably from 15 to 25% by mass in the silver paste (100% by mass).

Examples of the additive include resistance adjusting agents (e.g., Ni, Al, Sn, Pt, Pd, etc.), coloring agents (e.g., V, Mn, Fe, Co, Mo, and compounds thereof, etc.), and the like.

The content of the additive is preferably not more than 2% by mass, and more preferably not more than 1% by mass in the silver paste (100% by mass).

(Lead-Free Solder Alloy)

The lead-free solder alloy used in the present embodiment consists essentially of tin and silver.

It is meant by the term "essentially" that impurities which are inevitable from the production standpoint may be contained.

The content of tin is 95% by mass or more, preferably from 95 to 98.5% by mass, and more preferably from 96 to 98% by mass in the lead-free solder alloy (100% by mass). When the content of tin is 95% by mass or more (the content of silver is not more than 5% by mass), cracking is hardly caused on the glass sheet 10 in the soldered portion between the terminal connection part and the connection terminal for the following reason 4.

Reason 4: When the content of tin is 95% by mass or more, the melting point of the lead-free solder alloy is controlled to a relatively low level. When the melting point of the lead-free solder alloy is low, the soldering temperature can be controlled to a low level, so that the increase in temperature of the glass sheet 10 is suppressed. As a result, a residual stress generated on the glass sheet 10 is also suppressed, so that cracking is hardly caused on the glass sheet.

The lead-free solder alloy contains silver as a metal other than tin. In view of the fact that the lead-free solder alloy contains silver, a lowering of the appearance design completeness of the soldered portion between the terminal connection part and the connection terminal is prevented for the following reason 5.

Reason 5: If a tin based lead-free solder alloy which does not contain silver is used, because of compatibility between tin in the lead-free solder alloy and the silver component in the conductor layer, the penetration (silver erosion) of the solder alloy into the terminal connection part of the conductor layer is easy to occur, discoloration of the terminal connection part or discoloration of a portion of the terminal connection part to be caused due to the fact that its thickness becomes locally thin, or the like is generated, and the completeness of an appearance design as the windowpane for vehicles is lowered. On the other hand, when the lead-free solder alloy which is substantially composed of tin and silver is used, since tin in the lead-free solder alloy has already formed a compound with silver, silver of the conductor layer (terminal connection part) hardly penetrates into tin in the lead-free solder alloy, so that the discoloration of the subject portion and the lowering of the completeness of an appearance design accompanied with the discoloration are suppressed.

The content of silver is preferably from 1.5 to 5% by mass, and more preferably from 2 to 4% by mass in the lead-free solder alloy (100% by mass). When the content of silver is 1.5% by mass or more, tin in the lead-free solder alloy more hardly penetrates into the conductor layer (terminal connection part). In addition, the joining strength becomes sufficiently high. When the content of silver is not more than 5% by mass, the cost of the lead-free silver alloy can be controlled to a low level. In addition, an increase of the melting point of the lead-free solder alloy can be suppressed.

In the backlite 1 as described previously, the specific resistance of the conductor layer formed on the surface of the glass sheet 10 by sintering a silver paste is from 2.5 to 6.5 $\mu\Omega$cm, the line width of the strip part of the conductor layer is not more than 0.35 mm, and a lead-free solder alloy which consists essentially of tin and silver and which has a content of tin of 95% by mass or more is used as the lead-free solder alloy for soldering between the conductor layer and the connection terminal. Therefore, for the foregoing reasons, nonetheless the tin-silver based lead-free solder alloy is used, cracking is hardly caused on the glass sheet in the soldered portion between the terminal connection part of the conductor layer and the connection terminal.

For example, in the backlite 1, cracking is not caused on the glass sheet 10 even after elapsing 500 cycles in a thermal shock test where a cycle of keeping the windowpane at −30° C. for 30 minutes, followed by increasing a temperature thereof to 80° C. in 3 minutes, keeping the same at 80° C. for 30 minutes, and decreasing the temperature thereof to −30° C. in 3 minutes is repeated as one cycle.

The backlite 1 having such properties can be, for example, produced by a production method of a windowpane for vehicles described in an embodiment as described later.

Incidentally, the windowpane for vehicles as an embodiment of the present invention may be a windowpane for vehicles comprising a glass sheet; a conductor layer which is formed on a surface of the glass sheet by sintering a silver paste containing a silver powder and a glass frit, has a specific resistance and has at least a strip part and a terminal connection part connected to the strip part; and a connection terminal soldered onto the terminal connection part with a lead-free solder alloy having a prescribed composition, and it is not limited to the automobile backlite 1 illustrated in the accompanying drawings. For example, the windowpane for vehicles may be a windowpane for vehicles provided with only either one of a defogger or an antenna as the conductor layer. In addition, the conductor layer may be a deicer (heater for melting ice and snow) in MSW (Melting Snow Window).

Windowpane for Vehicles of Second Embodiment

The windowpane for vehicles of the present embodiment is a windowpane for vehicles comprising a glass sheet, a conductor layer which is formed on a surface of the glass sheet by sintering a silver paste containing a silver powder and a glass frit, said conductor layer comprising at least a strip part and a terminal connection part connected to the strip part, and a connection terminal soldered onto the terminal connection part with a lead-free solder alloy, wherein the conductor layer has a specific resistance of from 2.5 to 6.5 $\mu\Omega$cm, the strip part has a line width of not more than 0.35 mm, the lead-free solder alloy consists essentially of tin and silver and has a content of tin of 95% by mass or more, and the windowpane for vehicles is obtained by preheating the glass sheet at a temperature of 50° C. or higher and not higher than a temperature at which the lead-free solder alloy begins to melt and then performing said soldering.

The constitution of the windowpane for vehicles of the present embodiment is the same as that in the foregoing first embodiment, except that the matter of "obtained by preheating the glass sheet at a temperature of 50° C. or higher and not higher than a temperature at which the lead-free solder alloy begins to melt and then performing said soldering" is an essential requirement in place of the matter of "a cracking is not caused on the glass sheet even after elapsing 500 cycles in a thermal shock test where a cycle of keeping the windowpane for vehicles at −30° C. for 30 minutes, followed by increasing a temperature of the windowpane to 80° C. in 3 minutes, keeping the windowpane at 80° C. for 30 minutes, and decreasing the temperature of the windowpane to −30° C. in 3 minutes is repeated as one cycle".

The windowpane for vehicles of the present embodiment can be produced by a production method of a windowpane for vehicles of an embodiment as described later.

Windowpane for Vehicles of Third Embodiment

The windowpane for vehicles of the present embodiment is a windowpane for vehicles comprising a glass sheet, a conductor layer which is formed on a surface of the glass sheet by sintering a silver paste containing a silver powder and a glass frit, said conductor layer comprising at least a strip part and a terminal connection part connected to the strip part, and a connection terminal soldered onto the terminal connection part with a lead-free solder alloy, wherein the conductor layer has a specific resistance of from 2.5 to 6.5 $\mu\Omega$cm, the strip part has a line width of not more than 0.35 mm, the lead-free solder alloy consists essentially of tin, silver and further at least one metal selected from the group consisting of copper, indium, bismuth, and zinc and has a content of tin of 95% by mass or more, and a cracking is not caused on the glass sheet even after elapsing 500 cycles in a thermal shock test where a cycle of keeping the windowpane for vehicles at −30° C. for 30 minutes, followed by increasing a temperature of the windowpane to 80° C. in 3 minutes, keeping the windowpane at 80° C. for 30 minutes, and decreasing the temperature of the windowpane to −30° C. in 3 minutes is repeated as one cycle.

The constitution of the windowpane for vehicles of the present embodiment is the same as that in the foregoing first embodiment, except that the lead-free solder alloy in the foregoing first embodiment is changed to a "lead-free solder alloy which consists essentially of tin, silver and further at least one metal selected from the group consisting of copper, indium, bismuth, and zinc and which has a content of tin of 95% by mass or more".

In the lead-free solder alloy which is used in the present embodiment, the content of tin is 95% by mass or more, preferably from 95 to 98.5% by mass, and still more preferably from 96 to 98% by mass in the lead-free solder alloy (100% by mass). When the content of tin is 95% by mass or more (the content of silver and other metal is not more than 5% by mass), cracking is hardly caused on the glass sheet 10 in the soldered portion between the terminal connection part and the connection terminal for the foregoing reason 4.

The content of silver is preferably from 1.5 to 5% by mass, and more preferably from 2 to 4% by mass in the lead-free solder alloy (100% by mass). When the content of silver is 1.5% by mass or more, tin in the lead-free solder alloy more hardly penetrates into the conductor layer (terminal connection part). In addition, the joining strength becomes sufficiently high. When the content of silver is not more than 5% by mass, the cost of the lead-free silver alloy can be controlled to a low level. In addition, an increase of the melting point of the lead-free solder alloy can be suppressed.

The content of the at least one metal selected from the group consisting of copper, indium, bismuth, and zinc is preferably not more than 1% by mass, and more preferably not more than 0.5% by mass in the lead-free solder alloy (100% by mass).

The windowpane for vehicles of the present embodiment can be produced by a production method of a windowpane for vehicles of an embodiment as described later, in which a lead-free solder alloy which consists essentially of tin, silver and further at least one metal selected from the group consisting of copper, indium, bismuth, and zinc and which has a content of tin of 95% by mass or more is used, and the glass sheet is preheated at a temperature of 210° C. or higher and not higher than a temperature at which the lead-free solder alloy begins to melt, and then performing the soldering.

<Production Method of a Windowpane for Vehicles>

The production method of a windowpane for vehicles of the present embodiment is a method for producing a windowpane for vehicles, comprising a step of printing a silver paste containing a silver powder and a glass frit on a surface of a glass sheet, a step of sintering the silver paste to form a conductor layer, which comprises at least a strip having a line width of not more than 0.35 mm and a terminal connection part connected to the strip part and which has a specific resistance of from 2.5 to 6.5 μΩcm, a step of attaching a lead-free solder alloy, which consists essentially of tin and silver and which has a content of tin of 95% by mass or more, to at least a connection terminal, a step of preheating the glass sheet having the conductor layer formed on the surface thereof at a temperature of 50° C. or higher and not higher than a temperature at which the lead-free solder alloy begins to melt, and a step of connecting the connection terminal to the terminal connection part with the lead-free solder alloy.

The glass sheet, the silver paste, and the lead-free solder alloy which are used in the production method of the present embodiment are the same as those described in the foregoing first embodiment.

The previous attachment of the lead-free solder alloy before connecting the terminal connection part and the connection terminal to each other may be made on only the connection terminal or both the connection terminal and the terminal connection part.

Specifically, it is preferable that the windowpane for vehicles as an example of the embodiments of the present invention is produced by a method including the following steps (a) to (e).

(a) A step of printing a black ceramic paste on the surface of the periphery of a glass sheet, followed by drying to form a picture frame-shaped black ceramic paste coated film.

(b) A step of printing a silver paste in a prescribed pattern (pattern containing a strip part and a terminal connection part) on the surface of the glass sheet and/or the surface of the black ceramic paste coated film, followed by drying to form a silver paste coated film.

(c) A step of sintering the silver paste coated film and the black ceramic paste coated film to simultaneously form a conductor layer having a strip part and a terminal connection part and a black ceramic part.

(d) A step of preheating the glass sheet having the conductor layer formed on the surface thereof at a temperature of 50° C. or higher and not higher than a temperature at which the lead-free solder alloy begins to melt.

(e) A step of soldering a connection terminal having a lead-free solder alloy previously attached thereto onto the terminal connection part on the surface of the preheated glass sheet.

(Step (a))

Examples of the printing method in the step (a) include a screen printing method, a gravure printing method, and the like. In view of the fact that the black ceramic paste can be easily printed in a desired thickness on the surface of a large-area glass sheet or curved glass sheet, the screen printing method is preferable.

A drying temperature in the step (a) is usually from 100 to 150° C.

A drying time in the step (a) is usually from 5 to 20 minutes.

(Step (b))

Examples of the printing method in the step (b) include a screen printing method, a gravure printing method, and the like. In view of the fact that the silver paste can be easily printed in a desired thickness on the surface of a large-area glass sheet or curved glass sheet, the screen printing method is preferable.

A drying temperature in the step (b) is usually from 100 to 150° C.

A drying time in the step (b) is usually from 5 to 20 minutes.

(Step (c))

A sintering temperature in the step (c) is usually from 600 to 700° C.

A sintering time in the step (c) is usually from 2 to 5 minutes.

After sintering, the glass sheet may be subjected to a glass strengthening treatment by quenching the glass sheet from a temperature of 600° C. or higher to a temperature not higher 400° C.

(Step (d))

A preheating temperature in the step (d) is a temperature of 50° C. or higher and not higher than a temperature at which the lead-free solder alloy begins to melt, preferably from 75 to 210° C., more preferably from 100 to 210° C., still more preferably from 100 to 150° C., and yet still more preferably from 100 to 130° C. When the preheating temperature is 50° C. or higher, the generation of a residual stress of the glass sheet can be minimized; and when the preheating temperature is 75° C. or higher, the temperature change of the glass sheet on the occasion of soldering of the connection terminal becomes smaller, and hence, the residual stress generated on the glass sheet is more suppressed, so that cracking is hardly caused on the glass sheet. When the preheating temperature exceeds the temperature at which the lead-free solder alloy begins to melt, it becomes difficult to fix the connection terminal having a lead-free solder alloy previously attached thereto to the glass sheet. When the preheating temperature is not higher than 210° C., the subject temperature is a temperature that is sufficiently lower than the temperature at which the lead-free solder alloy begins to melt, and hence, it is easy to fix the connection terminal having a lead-free solder alloy previously attached thereto to the glass sheet.

In the case of the lead-free solder alloy which is used in the present embodiment and the foregoing first and second embodiments (lead-free solder alloy which consists essentially of tin and silver and which has a content of tin of 95% by mass or more), the temperature at which the lead-free solder temperature begins to melt is a solidus temperature and falls within the range of from 220 to 230° C.

In the case of the lead-free solder alloy which is used in the foregoing third embodiment (lead-free solder alloy which consists essentially of tin, silver and further at least one metal selected from the group consisting of copper, indium, bismuth, and zinc and which has a content of tin of 95% by mass or more), although a distinct solidus temperature is hardly defined, the temperature at which the lead-free solder temperature begins to melt falls within the range of from 220 to 230° C.

Examples of the preheating method include a method of blowing hot air from a dryer, a heating method by a band heater, a method of heating by an infrared lamp heater, and the like.

(Step (e))

In the step (e), soldering is performed while preheating such that the temperature of the glass sheet keeps the foregoing preheating temperature.

A soldering temperature (tip temperature of a soldering iron) is generally from 270 to 330° C.

(Action and Effect)

In the production method of a windowpane for vehicles of the present embodiment as described previously, the specific resistance of the conductor layer formed on the surface of the glass sheet by sintering a silver paste is from 2.5 to 6.5 μΩcm, the line width of the strip part of the conductor layer is not more than 0.35 mm, a lead-free solder alloy which consists essentially of tin and silver and which has a content of tin of 95% by mass or more is used as the lead-free solder alloy for soldering between the conductor layer and the connection terminal, and soldering is performed in a state where the glass sheet having the conductor layer formed on the surface thereof is preheated at a temperature of 50° C. or higher and not higher than a temperature at which the lead-free solder alloy begins to melt. Therefore, nonetheless the tin-silver based lead-free solder alloy is used, a windowpane for vehicles in which cracking is hardly caused on the glass sheet in the soldered portion between the terminal connection part of the conductor layer formed on the surface of the glass sheet by sintering the silver paste and the connection terminal (for example, cracking is not caused on the glass sheet even after elapsing 500 cycles in the foregoing thermal shock test) can be produced.

EXAMPLES

The embodiments of the present invention are hereunder described in more detail by reference to the following Examples, but it should not be construed that the present invention is limited to these Examples. Incidentally, Examples 1 to 5, 13 to 16, and 19 are concerned with a working example, with the remainder being concerned with a comparative example.

(Specific Resistance)

A silver paste was printed on the surface of a glass sheet, fired at 700° C. for 4 minutes, and then quenched for strengthening to not higher than 300° C., thereby forming a conductor layer having a strip part having a line width of 1.0 mm. Thereafter, an electric resistance of the strip part in a length of 200 mm and a cross-sectional area of the strip part were measured at 25° C.±2° C., and a specific resistance of the conductor layer was determined according to the following equation (1).

$$\text{Specific resistance } (\mu\Omega cm) = [\{\text{electric resistance } (\Omega)\} \times \{\text{cross-sectional area of strip part } (m^2)\} \times 10^8]/\{\text{length of strip part (namely, 0.2 m)}\} \quad (1)$$

The electric resistance was measured using a resistance measuring device (MULTIMETER, manufactured by Hioki E. E. Corporation). The cross-sectional area was measured using a contact-type film thickness meter (SURFCOM, manufactured by Tokyo Seimitsu Co., Ltd.). The electric resistance and the cross-sectional area were each measured in three places for every sample, and an average value thereof was determined.

(Thermal Shock Test)

The sample was subjected to a thermal shock test where a cycle of keeping the same at −30° C. for 30 minutes, followed by increasing the temperature thereof to 80° C. in 3 minutes, keeping the same at 80° C. for 30 minutes, and decreasing the temperature thereof to −30° C. in 3 minutes is repeated as one cycle, and the state (presence or absence of cracking) of the surface of the glass sheet after elapsing 500 cycles was visually confirmed.

The thermal shock test was performed with respect to three samples, and the evaluation was made according to the following criteria.

○: Cracking was not caused in all of the three samples.

Δ: Cracking was caused in one or two of the samples.

x: Cracking was caused in all of the three samples.

(Joining Strength)

In the case where after carrying out the thermal shock test, cracking was not caused on the glass sheet in all of the three samples, the joining strength was measured.

Specifically, in the joined state shown in FIG. 2, the wiring connection part 46 of the connection terminal 40 was pulled upward to a stress of 50 N at a rate of 100 mm/min, and whether or not the connection terminal 40 exfoliated was confirmed. A sample in which the connection terminal 40 did not exfoliate was defined such that its joining strength was 50 N or more. The evaluation was made according to the following criteria.

◯: The joining strength was 50 N or more in all of the three samples.

Δ: The joining strength was 50 N or more in one or two of the samples.

x: The joining strength was less than 50 N in all of the three samples.

Example 1

A sample in the joined state shown in FIG. 2 was fabricated through the following steps (a) to (e).

(Step (a))

A glass sheet (soda line glass) of 100 mm×100 mm×3.5 mm in thickness was prepared as the glass sheet 10.

A black ceramic paste was subjected to screen printing on the surface of the glass sheet 10 and then dried at 120° C. for 15 minutes, thereby forming a black ceramic paste coated film.

(Step (b))

A silver paste containing a silver powder and a glass fit and having a content of the silver powder of 80% by mass (specific resistance after sintering: 2.8 μΩcm) was subjected to screen printing on the surface of the black ceramic paste coated film and then dried at 120° C. for 10 minutes, thereby forming a silver paste coated film.

(Step (c))

The silver paste coated film and the black ceramic paste coated film were fired at 700° C. for 4 minutes. After sintering, the glass sheet 10 was quenched to not higher than 300° C. to form a strengthened glass sheet. Thereafter, the glass sheet 10 was allowed to stand until its temperature decreased to ordinary temperature, thereby simultaneously forming the black ceramic part 12 and the conductor layer 20 (thickness: 7 μm) on the surface of the glass sheet 10.

(Step (d))

The copper-made connection terminal 40 which had been plated with tin on the surface thereof was prepared. The two joint surfaces 42 are equal to each other in terms of an area, and a total sum of the areas of the two joint surfaces 42 are 56 mm².

In addition, the tin-silver based lead-free solder alloy 50 having a content of tin of 98% by mass and a content of silver of 2% by mass was prepared.

The lead-free solder alloy 50 in an amount of from 0.3 to 0.6 g per the connection terminal 40 was previously attached onto the two joint surfaces 42 of the connection terminal 40.

After coating a flux on the lead-free solder alloy 50, the connection terminal 40 having the lead-free solder alloy 50 provided therewith was fixed onto the surface of the conductor layer 20 of the glass sheet 10 using a pair of tweezers.

Hot air at 400° C. was blown onto the surface of the side of the conductor layer 20 of the glass sheet 10 from a dryer whose distance from the glass sheet 10 was adjusted, in such a manner that a temperature of a thermocouple disposed at a place of 10 mm far from a terminal-installing part of the conductor layer 20 was 210° C. as a preheating temperature.

(Step (e))

The connection terminal 40 was pressed against the conductor layer 20 (bus bar 24) while blowing hot air at 400° C. from a dryer so as to keep the surface temperature of the glass sheet 10 at 210° C. as a preheating temperature, and a soldering iron (iron tip temperature: about 270° C.) was pushed against the connection terminal 40, thereby performing soldering. The glass sheet 10 was allowed to stand at room temperature for 24 hours, thereby obtaining a sample. The sample was subjected to the foregoing evaluations. Results are shown in Table 1.

Examples 2 to 6

Samples were obtained in the same manner as that in Example 1, except for changing the preheating temperature to a temperature shown in Table 1 or not performing the preheating. The samples were subjected to the foregoing evaluations. Results are shown in Table 1.

Examples 7 to 12

Samples were obtained in the same manner as that in Examples 1 to 6, respectively, except for changing the silver paste to a silver paste having a content of the silver powder of 70% by mass (specific resistance after sintering: 9.1 μΩcm). The samples were subjected to the foregoing evaluations. Results are shown in Table 1.

Examples 13 to 18

Samples were obtained in the same manner as that in Example 4, except for changing the specific resistance of the conductor layer 20. The samples were subjected to the foregoing evaluations. Results are shown in Table 1.

TABLE 1

| Example | Specific resistance of conductor layer μΩcm | Composition of lead-free solder alloy (% by mass) | | Preheating temperature of glass sheet ° C. | Thermal shock test | |
|---|---|---|---|---|---|---|
| | | Sn | Ag | | Cracking | Joining strength |
| 1 | 2.8 | 98 | 2 | 210 | ◯ | ◯ |
| 2 | 2.8 | 98 | 2 | 150 | ◯ | ◯ |
| 3 | 2.8 | 98 | 2 | 125 | ◯ | ◯ |
| 4 | 2.8 | 98 | 2 | 100 | ◯ | ◯ |
| 5 | 2.8 | 98 | 2 | 75 | ◯ | ◯ |
| 6 | 2.8 | 98 | 2 | Nil (ordinary temperature) | Δ | — |
| 7 | 9.0 | 98 | 2 | 210 | ◯ | Δ |
| 8 | 9.0 | 98 | 2 | 150 | ◯ | Δ |
| 9 | 9.0 | 98 | 2 | 125 | Δ | — |
| 10 | 9.0 | 98 | 2 | 100 | Δ | — |
| 11 | 9.0 | 98 | 2 | 75 | X | — |
| 12 | 9.0 | 98 | 2 | Nil (ordinary temperature) | X | — |
| 13 | 3.8 | 98 | 2 | 100 | ◯ | ◯ |
| 14 | 4.5 | 98 | 2 | 100 | ◯ | ◯ |
| 15 | 5.2 | 98 | 2 | 100 | ◯ | ◯ |
| 16 | 6.1 | 98 | 2 | 100 | ◯ | ◯ |
| 17 | 7.0 | 98 | 2 | 100 | Δ | — |
| 18 | 7.9 | 98 | 2 | 100 | Δ | — |

As shown in the forgoing results, in Examples 1 to 5 and Examples 13 to 16 in which the conductor layer was formed such that the specific resistance was from 2.8 to 6.1 μΩcm, and the glass was preheated at a temperature higher than ordinary temperature and then soldered, by making the silver powder in the conductor layer dense to make voids small, thereby controlling the specific resistance of the conductor layer to a low level and also suppressing a residual stress to be generated due to a difference in thermal expansion rate, which is conducted into the glass sheet 10 via the terminal connection parts 24a and 34, cracking was not caused on the glass sheet 10 even at the joining strength of the connection terminal after the thermal shock test. In addition, windowpanes for vehicles, in which good results are obtained regarding the joining strength, and even when exposed to high temperature or low temperature, a good joining strength is kept, cracking of the glass sheet can be prevented from occurring, and the completeness of an appearance design is high, were obtained.

Examples 19 to 26

Samples were obtained in the same manner as that in Examples 1, 2, 4, 6, 7, 8, 10, and 12, respectively, except for changing the lead-free solder alloy to a tin-silver-copper based lead-free solder having a content of tin of 96.5% by mass, a content of silver of 3% by mass, and a content of copper of 0.5% by mass. The samples were subjected to the foregoing evaluations. Results are shown in Table 2.

TABLE 2

| Example | Specific resistance of conductor layer μΩcm | Composition of lead-free solder alloy (% by mass) | | | Preheating temperature of glass sheet °C. | Thermal shock test | |
|---|---|---|---|---|---|---|---|
| | | Sn | Ag | Cu | | Cracking | Joining strength |
| 19 | 2.8 | 96.5 | 3 | 0.5 | 210 | ○ | ○ |
| 20 | 2.8 | 96.5 | 3 | 0.5 | 150 | Δ | — |
| 21 | 2.8 | 96.5 | 3 | 0.5 | 100 | Δ | — |
| 22 | 2.8 | 96.5 | 3 | 0.5 | Nil (ordinary temperature) | Δ | — |
| 23 | 9.0 | 96.5 | 3 | 0.5 | 210 | X | — |
| 24 | 9.0 | 96.5 | 3 | 0.5 | 150 | X | — |
| 25 | 9.0 | 96.5 | 3 | 0.5 | 100 | X | — |
| 26 | 9.0 | 96.5 | 3 | 0.5 | Nil (ordinary temperature) | X | — |

As shown in the foregoing results, in Example 19 in which the conductor layer was formed such that the specific resistance was 2.8 μΩcm, and the glass was preheated at 210° C. and then soldered, a windowpane for vehicles, in which good results are obtained regarding the joining strength, and even when exposed to high temperatures or low temperatures, a good joining strength is kept, cracking of the glass sheet can be prevented from occurring, and the completeness of an appearance design is high, was obtained.

While the invention has been described in detail and with reference to specific embodiments thereof, it will be apparent to one skilled in the art that various changes and modifications can be made therein without departing from the spirit and scope thereof.

The present application is based on a Japanese patent application filed on Jan. 14, 2011 (Japanese Patent Application No. 2011-005866), the contents of which are incorporated herein by reference.

INDUSTRIAL APPLICABILITY

The windowpane for vehicles as an embodiment of the present invention is useful as an automobile backlite provided with a defogger, a deicer, an antenna, etc., and the like.

EXPLANATIONS OF REFERENCE NUMERALS AND SIGNS

1: Backlite
10: Glass sheet
12: Black ceramic part
20: Defogger
22: Heater line
24: Bus bar
24a: Terminal connection part (electricity feeding point) (of defogger)
30: Antenna
32: Antenna conductor
34: Terminal connection part (of antenna)
40: Connection terminal
42: Joint surface
44: Leg part
46: Wiring connection part
50: Lead-free solder alloy

The invention claimed is:

1. A windowpane for vehicles, comprising
a glass sheet,
a conductor layer which is formed on a surface of the glass sheet by sintering a silver paste containing a silver powder and a glass frit, said conductor layer comprising at least a strip part and a terminal connection part connected to the strip part, and
a connection terminal soldered onto the terminal connection part with a lead-free solder alloy,
wherein the conductor layer has a specific resistance at 25° C.±2° C. of from 2.5 to 6.5 μΩcm,
wherein the strip part has a line width of not more than 0.35 mm, and
wherein the lead-free solder alloy consists essentially of tin and silver and has a content of tin of 95% by mass or more, and
wherein the windowpane for vehicles is obtained by preheating at about the surface of the conductor layer formed on the glass sheet so as to keep the temperature of the surface of the conductor layer formed on the glass sheet at a temperature of 50° C. to 210° C. and not higher than a temperature at which the lead-free solder alloy begins to melt and then performing said soldering.

2. The windowpane for vehicles according to claim 1, which is obtained by preheating the glass sheet at a temperature of 75° C. to 210° C. and not higher than a temperature at which the lead-free solder alloy begins to melt and then performing said soldering.

3. The windowpane for vehicles according to claim 1, wherein a content of the silver powder contained in the silver paste is from 65 to 85% by mass, and an average particle diameter of the silver powder is from 0.1 to 10 μm.

4. The windowpane for vehicles according to claim 1, wherein the conductor layer has a thickness of from 5 to 20 μm.

5. The windowpane for vehicles according to claim 1, wherein the line width of the strip part is from 0.15 to 0.35 mm.

6. The windowpane for vehicles according to claim 1, wherein the conductor layer is a defogger, a deicer, or an antenna.

7. The windowpane for vehicles according to claim 1, wherein the silver powder is densely disposed in the conductor layer.

8. The windowpane for vehicles according to claim 1, wherein the silver powder comprises a blend of plural kinds of silver powders having different average particle diameter from each other.

9. The windowpane for vehicles according to claim 1, wherein the silver paste comprises at least one selected from the group consisting of Ni, Al, Sn, Pt, Pd, V, Mn, Fe, Co, Mo, a compound of V, a compound of Mn, a compound of Fe, a compound of Co and a compound of Mo.

10. A method for producing a windowpane for vehicles, comprising steps of printing a silver paste containing a silver powder and a glass frit on a surface of a glass sheet, sintering the silver paste to form a conductor layer, which comprises at least a strip having a line width of not more than 0.35 mm and a terminal connection part connected to the strip part and which has a specific resistance at 25° C.±2° C. of from 2.5 to 6.5μΩcm, attaching a lead-free solder alloy, which consists essentially of tin and silver and which has a content of tin of 95% by mass or more, to at least a connection terminal, preheating at about the surface of the conductor layer to formed on the glass sheet so as to keep the temperature of the surface of the conductor layer formed on the glass sheet at a temperature of 50° C. to 210° C. and not higher than a temperature at which the lead-free solder alloy begins to melt, and connecting the connection terminal to the terminal connection part with the lead-free solder alloy.

11. The method for producing a windowpane for vehicles according to claim 10, wherein the glass sheet having the conductor layer formed on the surface thereof is preheated at a temperature of 75° C. to 210° C. and not higher than a temperature at which the lead-free solder alloy begins to melt.

12. The method for producing a windowpane for vehicles according to claim 10, wherein a content of the silver powder contained in the silver paste is from 65 to 85% by mass, and an average particle diameter of the silver powder is from 0.1 to 10 μm.

13. The method for producing a windowpane for vehicles according to claim 10, wherein the conductor layer has a thickness of from 5 to 20 μm.

14. The method for producing a windowpane for vehicles according to claim 10, wherein the line width of the strip part is from 0.15 to 0.35 mm.

* * * * *